United States Patent [19]
O'Quinn et al.

[11] Patent Number: 6,020,377
[45] Date of Patent: Feb. 1, 2000

[54] MODIFIED TALL OIL SUPPLEMENTED DIET FOR GROWING-FINISHING PIGS

[75] Inventors: Patrick R. O'Quinn; Kevin Q. Owen; Jim L. Nelssen, all of Manhattan; Mike Tokach, Abilene; Robert D. Goodband, Manhattan, all of Kans.

[73] Assignee: Kansas State University Research Foundation, Manhattan, Kans.

[21] Appl. No.: 09/041,926

[22] Filed: Mar. 13, 1998

[51] Int. Cl.⁷ ..................................................... A61K 31/20
[52] U.S. Cl. ........................................... 514/560; 514/588
[58] Field of Search ..................... 514/560, 558

[56] References Cited

U.S. PATENT DOCUMENTS

| | | | |
|---|---|---|---|
| 5,374,428 | 12/1994 | Hansen et al. | 424/438 |
| 5,428,072 | 6/1995 | Cook et al. | 514/560 |
| 5,480,659 | 1/1996 | Tokach et al. | 426/2 |

OTHER PUBLICATIONS

Kirk–Othmer Encyclopedia of Chemical Technology, 4th Ed., vol. 23, pp. 616–622 (1997).

Kirk–Othmer Encyclopedia of Chemical Technology, 4th Ed., vol. 5, pp. 187–189 (1993).

*Inform*, vol. 7, No. 2, Conjugated Linoleic Acid (Feb. 1996).

Chin et al.; Conjugated Linoleic Acid is a Growth Factor for Rats as Shown by Enhanced Weight Gain and Improved Feed Efficiency, *J. Nutr.*, 124:2344–2349 (1994).

"Abstracts" *American Society of Animal Science Midwestern Section* Mar. 16–18, 1998, Des Moines, IA.

Dugan, et al. "The Effect of Conjugated Linoleic Acid on Fat to Lean Repartitioning and Feed Conversion in Pigs" *Canadian Journal of Animal Science* 77:pp. 723–725(1997).

*Primary Examiner*—Kevin E. Weddington
*Attorney, Agent, or Firm*—Hovey,Williams, Timmons & Collins

[57] ABSTRACT

Modified tall oil supplemented pig diet is provided which increases the average daily gain and improves the carcass characteristics of pigs. The diets of the invention include from about 12–50% by weight of total protein (e.g., from corn and soy) and from about 0.25% to about 0.75% by weight modified tall oil. In one embodiment, the diet includes a mixture of conjugated linoleic acids having a specific fatty acid profile.

26 Claims, No Drawings

MODIFIED TALL OIL SUPPLEMENTED DIET FOR GROWING-FINISHING PIGS

BACKGROUND OF THE INVENTION

1. Field of the Invention

The present invention is broadly concerned with an improved pig diet designed to enhance the average daily gain (ADG) and carcass characteristics of pigs. More particularly, the invention pertains to an animal feed and corresponding method, wherein the diet contains from about 12% to about 50% by weight of total protein (generally obtained from corn and soy) and at least about 0.25% weight of modified tall oil having a desirable unsaturated fatty acid profile.

2. Description of the Prior Art

Swine producers are constantly seeking ways to reduce the amount of time necessary for animals to achieve their market weight. There are numerous monetary incentives for quickly getting an animal to market, the most obvious of which is that, the sooner the animal is sold, the sooner the producer makes a profit off that animal. Other benefits are less obvious to people outside the farming industry. One such benefit is reduced yardage costs. Yardage costs include heating and cooling the building in which the animal is housed, time and equipment involved in cleaning up after the animal, and veterinarian bills and other medical expenses necessary to keep the animal healthy. Clearly, reducing the amount of time necessary to finish an animal can significantly decrease the yardage costs.

The yardage costs associated with raising a pig from farrow to finish is presently about ten cents per day. By simply reducing the number of days by five, the food producer would save fifty cents per pig. Typically, a producer has a limited number of pigs that he or she can house at any given time. By getting a pig to market sooner, the producer can fill that spot with another piglet and can reap the corresponding profit increase. Moreover, in a large hog operation thousands of pigs may be finished per cycle, and hence, saving fifty cents per pig results in a substantial cumulative benefit for the producer. This benefit continues to grow with each day that is deducted from the time necessary to ready the pig for market.

One product on the market which is used to supplement pig diets is Conjugated Linoleic Acid (CLA). CLA is a collective term used to describe several forms of linoleic configuration. Conjugated linoleic acid has either the cis or trans acid, or both, located on carbons 9 and 11, 10 and 12, or 11 and 13. It is thought that the cis 9, trans 11 form of CLA is the biologically active form which can be incorporated into phospholipids in the body. Modified tall oil and the Tonalin™ CLA 60 contain a similar concentration of this cis 9, trans 11 fatty acid. Therefore, the differences in pig performance observed from feeding MTO must be related to other conjugated fatty acids or compounds contained within MTO. It has been shown that the feeding of CLA to laboratory animals improves the rate of gain and the efficiency of gain and decreases fat deposition (See U.S. Pat. No. 5,428,072 to Cook et al.). However, CLA acts to decrease the average daily feed intake (ADFI) which leads to reduced caloric intake by the pig. This reduction inhibits the ADG of the pig. By inhibiting the ADG, pigs whose diets are supplemented with CLA take longer to attain their market weight than those pigs whose diets are not supplemented with CLA. Thus, while CLA has known advantages, its drawback in lowering the ADG of finishing pigs are significant.

Accordingly, there is a need in the art for a feed supplement which decreases the number of days required to bring a pig to its market weight while retaining the advantages of CLA. Pigs consuming this supplement should have desirable carcass characteristics, including a decrease in the percentage of drip loss, when compared to pigs who have not consumed the supplement. Furthermore, this supplement should be inexpensive and readily available.

SUMMARY OF THE INVENTION

The present invention overcomes the problems outlined above by providing an improved and economical supplemented animal feed and method for increasing the average daily gain (ADG) of pigs at all growth intervals (from farrow to finish). The invention is predicated on the fact that Modified Tall Oil (MTO), having a desirable unsaturated fatty acid profile can be added in small amounts to the pigs normal diet, increasing the ADG and thus decreasing the number of days necessary to attain market weight. The addition of MTO also improves the carcass characteristics of the pig when compared with non-supplemented pig diets.

MTO is a by-product of the kraft paper process. Because of the huge output in the paper industry each year, MTO is readily available and very inexpensive. The specific makeup of one preferred MTO product ("Pamolym MTO") is illustrated in Table A which also sets forth broad and preferred ranges for usable MTO products generally.

TABLE A

Chemical Makeup of Modified Tall Oil

| Component | Pamolyn MTO % By Weight | Broad Ranges % By Weight | Preferred Ranges % By Weight |
|---|---|---|---|
| Palmitic Acid, 16:0 | 0.46% | up to 5% | 0.01%–3% |
| Stearic Acid, 18:0 | 0.07% | up to 4% | 0.01%–3% |
| Oleic Acid, 18:1 | 19.84% | up to 20% | 10%–20% |
| Linoleic Acid, 18:2 (c9, c12) | 2.29% | up to 4% | 1.5%–3% |
| Conjugated Linoleic Acid, 18:2 (c&t 9, 11 mix)[a] | 20.52% | up to 24% | 15%–21% |
| Conjugated Linoleic Acid, 18:2 (t9, t11)[b] | 14.80% | 5%–20% | 10%–17% |
| Conjugated Linoleic Acid, 18:2 (c10, c12)[c] | 13.98% | 8%–18% | 11%–16% |
| Conjugated Linoleic Acid, 18:2 (t10, c12)[d] | 14.37% | 8%–18% | 9%–16% |
| 3 Conjugated Linoleic Acid Peaks, 18:2[e] | 8.83% | 4%–11% | 6%–10% |
| Unknown | 4.83% | — | — |
| Conjugate 1 + Conjugate 2 mixture | 35.32% | 27%–42% | 30%–40% |
| Conjugate 1 + Conjugate 2 + Conjugate 3 + Conjugate 4 + Conjugate 5 Mixture | 72.50% | 60%–85% | 70%–80% |

[a]Hereinafter referred to as Conjugate 1.
[b]Hereinafter referred to as Conjugate 2.
[c]Hereinafter referred to as Conjugate 3.
[d]Hereinafter referred to as Conjugate 4.
[e]Hereinafter referred to as Conjugate 5.

Unless otherwise indicated, "modified tall oil" or "MTO" refers to a fatty acid composition having the Conjugate 1, Conjugate 2, Conjugate 3, Conjugate 4, and Conjugate 5 within the broad ranges of the foregoing table. As used herein, "c" and "t" refer to the cis and trans isomers of the particular conjugated linoleic acid. Furthermore, the number following "c" or "t" (such as c9 or t11) refers to the carbon atom at which a double bond is located. The numbers "18:2" refer to the number of carbon atoms and the number of double bonds in the acid, respectively.

Broadly speaking, the MTO supplemented diets of the invention include adding MTO to the pigs' regular feed. Preferably, the feed includes at least about 0.25% by weight of MTO and more preferably from about 0.25%–1.0%. Most preferably the feed includes about 0.50% by weight of MTO. In one embodiment of the invention, the supplement has a fatty acid profile such that at least about 60% by weight of the supplement is made up of a mixture of Conjugate 1, Conjugate 2, Conjugate 3, Conjugate 4, and Conjugate 5, and at least about 27% by weight of the supplement is made up of a mixture of Conjugate 1 and Conjugate 2.

Normally, the diets hereof are fed on an ad libitum basis, but those skilled in the art will recognize that this is not a prerequisite.

If adding the MTO supplement to a feed, virtually any otherwise suitable feed may be used. Such diets typically include significant quantities of corn and soybean meal. In preferred forms, sufficient soy should be utilized so that at least about 10% of the total protein content of the diet comes from soy protein, and more preferably from about 25% to about 75% by weight of the total protein content should be soy protein. The diets of the invention advantageously include from about 2.5% to about 50% by weight of soybean-derived protein, and more preferably from about 5% to about 25% by weight soybean-derived protein therein. Similarly, the diets would normally include from about 45% to about 90% by weight corn, and more preferably from about 65% to about 80% by weight corn. Other cereal grains can also be used in the diets of the invention, e.g., wheat, sorghum, oat, canola, and barley. The preferred level of total protein is from about 12% to about 50% by weight and the most preferred level of total protein is from about 15% to about 22% by weight.

It is also possible to feed the supplements hereof separately from the solid feed, e.g., as a liquid directly fed or mixed with water. However, in such cases it is preferable that the amount of MTO fed be correlated with the amount of solid feed to achieve the best results. It is also preferred to feed sufficient MTO to achieve a feed efficiency (F/G, pound of feed consumed per pound of weight gain) which is at least about 0.75%, and more preferably at least about 1%, greater than an otherwise identical feed regimen free of the MTO.

DETAILED DESCRIPTION OF THE PREFERRED EMBODIMENTS

The following examples set forth the most preferred pig diets in accordance with the invention, as well as the method of feeding thereof. It is to be understood that these examples are presented by way of illustration only, and nothing therein should be taken as a limitation upon the overall scope of the invention.

EXAMPLE 1

Tests were conducted to compare the effects of modified tall oil (MTO) and Tonalin™ CLA 60 on growth performance, serum chemistry, and carcass composition of finishing barrows. Thirty-six crossbred barrows were blocked on the basis of initial weight and ancestry in a randomized complete block design and randomly allotted to the three dietary treatments with six replicate pens per treatment. The pigs were housed in an environmentally controlled finishing barn with two pigs in each 4 ft.×4 ft. totally slatted-floored pen. Feed and water were available ad libitum through one single hole self-feeder and a nipple waterer. The pigs were fed a diet in meal form in two phases—80 to 160 and 160 to 230 lb. BW. The composition of the basal diets is set forth in Table 1 for the Grower Pigs and Table 2 for the Finisher Pigs.

TABLE 1

Basal Diet Composition of Grower Pigs (As-fed Basis)[a]

| Ingredient, % | Control | MTO[b] | CLA[c] |
| --- | --- | --- | --- |
| Corn | 69.29 | 69.29 | 69.29 |
| Soybean meal (46.5% CP) | 27.47 | 27.47 | 27.47 |
| Limestone | 1.06 | 1.06 | 1.06 |
| Monocalcium phosphate | .85 | .85 | .85 |
| Soybean oil | .50 | 0.0 | 0.0 |
| Modified Tall Oil | 0.0 | .50 | 0.0 |
| Conjugated Linoleic Acid | 0.0 | 0.0 | .50 |
| Salt | .35 | .35 | .35 |
| Vitamin premix | .20 | .20 | .20 |
| Trace mineral premix | .15 | .15 | .15 |
| Antibiotic[d] | .13 | .13 | .13 |
| Total | 100.00 | 100.0 | 100.0 |

[a]Grower diets were fed from 80 to 160 lb BW and were formulated to contain 1.00% lysine, .65% Ca, and .55% total P.
[b]Pamolyn MTO, a by-product of kraft paper process
[c]Tonalin ™ CLA 60; Palmitic Acid, 16:0–7.65% by weight; Stearic Acid, 18:0–5.15% by weight; Oleic Acid, 18:1–24.73% by weight; Linoleic Acid, 18:1–4.81% by weight; Conjugated Linoleic Acid, 18:2 (c&t, 9, 11 mix) - 21.33% by weight; Conjugated Linoleic Acid, 18:2 (t9, t11) - 3.90% by weight; Conjugated Linoleic Acid, 18:2 (c10, weight; 3 Conjugated Linoleic Acid Peaks, 18:2–3.79% by weight; and Unknown - 1.85% by weight.
[d]Provided 100 g/ton tylosin

TABLE 2

Basal Diet Composition of Finisher Pigs (As-fed Basis)[a]

| Ingredient, % | Control | MTO[b] | CLA[c] |
| --- | --- | --- | --- |
| Corn | 78.63 | 78.63 | 78.63 |
| Soybean meal (46.5% CP) | 18.39 | 18.39 | 18.39 |
| Limestone | .89 | .89 | .89 |
| Monocalcium phosphate | .76 | .76 | .76 |
| Soybean oil | .50 | 0.0 | 0.0 |
| Modified Tall Oil | 0.0 | .50 | 0.0 |
| Conjugated Linoleic Acid | 0.0 | 0.0 | .50 |
| Salt | .35 | .35 | .35 |
| Vitamin premix | .20 | .20 | .20 |
| Trace mineral premix | .15 | .15 | .15 |
| Antibiotic[d] | .13 | .13 | .13 |
| Total | 100.0 | 100.0 | 100.0 |

[a]Finisher diets were fed from 160 to 230 lb BW and were formulated to contain 0.75% lysine, .55% Ca, and .55% total P.
[b]Pamolyn MTO, a by-product of kraft paper process
[c]Tonalin ™ CLA 60
[d]Provided 100 g/ton tylosin The pigs were weighed every 14 days in order to determine Average Daily Gain (ADG), Average Daily Feed Intake (ADFI), and feed efficiency in terms of feed consumed per pound of gain (F/G). After a three hour fast on the day before slaughter, plasma blood samples were collected from each pig. The samples were pooled for each pen and stored frozen until a triglyceride analysis was performed. When the average pen weight was 230 lb. BW, the pigs were slaughtered. At 24 hours post-mortem, standard carcass measurements, Minolta colorspectrometry (Hunter L*, a*, and b*) measurements, and visual analyses of the longissimus for coloring, marbling, and firmness were obtained. At 48 hours post-mortem, a drip los analysis was conducted.

The data was analyzed as a randomized complete block. The experimental unit for all calculations was "pen." The GLM procedure of SAS (1988) was used for single degree of freedom contrasts among the dietary treatments. Pigs fed MTO supplemented diets grew faster during the 80 to 160, 160 to 230, and 80 to 230 lb. BW growth intervals than pigs fed Tonalin™ CLA 60. This improved growth is attributable to increases in the ADFI by the pigs of each growth interval. The growth performance of the barrows is set forth in Table 3, and the carcass characteristics are set forth in Table 4.

TABLE 3

Growth Performance of Barrows Fed MTO or Tonalin ™ CLA 60[a]

| Item | Control (1) | MTO (2) | Tonalin ™ CLA 60 (3) | CV | Contrast Probability Values (P<) 1 vs 2 | 1 vs 3 | 2 vs 3 |
|---|---|---|---|---|---|---|---|
| 80 to 160 lb BW: | | | | | | | |
| ADG, lb | 2.30 | 2.35 | 2.17 | 4.24 | .35 | .03 | .01 |
| ADFI, lb | 5.78 | 5.79 | 5.57 | 5.63 | .93 | .28 | .25 |
| F/G | 2.51 | 2.46 | 2.57 | 5.04 | .49 | .43 | .15 |
| 160 to 230 lb BW: | | | | | | | |
| ADG, lb | 2.26 | 2.37 | 2.11 | 11.41 | .44 | .35 | .10 |
| ADFI, lb | 7.14 | 7.45 | 6.72 | 8.95 | .41 | .27 | .06 |
| F/G | 3.17 | 3.14 | 3.21 | 7.50 | .79 | .80 | .61 |
| 80 to 230 lb BW: | | | | | | | |
| ADG, lb | 2.28 | 2.36 | 2.14 | 7.28 | .39 | .17 | .03 |
| ADFI, lb | 6.44 | 6.60 | 6.13 | 7.30 | .56 | .27 | .10 |
| F/G | 2.83 | 2.79 | 2.87 | 5.14 | .64 | .62 | .34 |

[a]Values are means for two pigs/pen and six replicate pens/treatment.

TABLE 4

Carcass Characteristics of Barrows Fed MTO or CLA[a,b,c]

| Item | Control (1) | MTO (2) | Tonalin ™ CLA 60 (3) | CV | Contrast Probability Values (P<) 1 vs 2 | 1 vs 3 | 2 vs 3 |
|---|---|---|---|---|---|---|---|
| Shrink loss, % | 2.12 | 2.18 | 2.17 | 8.68 | .55 | .47 | .77 |
| Backfat, In: | | | | | | | |
| First rib | 1.45 | 1.35 | 1.37 | 9.15 | .21 | .38 | .93 |
| Tenth rib | .92 | .87 | .87 | 16.89 | .57 | .34 | .59 |
| Last rib | .77 | .72 | .72 | 10.81 | .31 | .68 | .71 |
| Last lumbar | .77 | .77 | .71 | 11.56 | .99 | .83 | .82 |
| Average[d] | .98 | .93 | .93 | 7.27 | .24 | .36 | .98 |
| LMA, in$^2$ | 5.68 | 5.67 | 5.45 | 7.68 | .97 | .23 | .22 |
| Lean %[e] | 50.95 | 51.35 | 51.15 | 4.65 | .77 | .34 | .45 |
| Dressing % | 72.65 | 72.32 | 71.61 | 1.31 | .57 | .61 | .93 |
| Visual color[f] | 2.65 | 2.50 | 2.60 | 7.28 | .20 | .39 | .90 |
| Firmness[f] | 3.18 | 3.07 | 3.15 | 21.70 | .78 | .65 | .51 |
| Marbling[f] | 2.48 | 2.83 | 2.82 | 19.05 | .27 | .26 | .76 |
| Hunter L*[g] | 50.93 | 52.70 | 52.66 | 6.14 | .53 | .65 | .47 |
| Hunter a*[g] | 10.80 | 11.00 | 12.01 | 25.53 | .93 | .99 | .96 |
| Hunter b*[g] | 7.00 | 7.57 | 7.89 | 29.31 | .76 | .82 | .71 |
| Hue angle[g] | 43.86 | 48.60 | 44.92 | 9.84 | .27 | .79 | .37 |
| Saturation index[g] | 13.11 | 13.36 | 14.39 | 22.80 | .93 | .64 | .71 |
| A:B ratio[g] | 1.55 | 1.45 | 1.53 | 7.28 | .33 | .79 | .45 |
| Drip loss, % | 3.03 | 2.98 | 2.83 | 43.00 | .93 | .21 | .23 |
| Triglycerides[h] | 33.33 | 40.17 | 41.17 | 29.58 | .32 | .26 | .88 |

[a]Values are means for two pigs/pen and six replicate pens/treatment.
[b]Hot carass weight was used as a covariant in the statistical analysis.
[c]Average backfat is the average of the first and last rib and last lumbar fat depths.
[d]Lean percentage was derived from NPPC equations.
[e]Scoring system fo 1 to 5:2 = grayish pink, traces to slight, or soft and watery; 3 = reddish pink, small to modest, or slightly firm and moist; and 4 = purplish red, moderate to slightly abundant, or firm and moderately dry for color, firmness, and marbling, respectively.
[f]Means were derived from three sample readings per loin. Measures of dark to light (Hunter L*), redness (Hunter a*), yellowness (Hunter b*), red to orange (hue angle), or vividness or intensity (saturation index).
[g]Belly firmness scores refer to the degree of droop (inches) when the bellies were centrally suspended by a bar. Thus, larger values indicate firmer bellies. Belly length and wight were used as covariants for this portion fo the statistical analysis.
[h]Values represent the pooled results of both pigs/pen bled the day before slaughter.

EXAMPLE 2

A second experiment was conducted to determine if the positive visual trends observed in Example 1 with the MTO supplemented diets could be realized in a larger dose titration experiment. Eighty crossbred barrows were used in a growth trial utilizing increasing dietary MTO. Pigs were blocked on the basis of initial weight and ancestry and randomly allotted to the four dietary treatments with ten replicate pens per treatment. The pigs were housed in an environmentally controlled finishing barn with two pigs in each 4 ft.×4 ft. totally slatted-floored pen. Feed and water were available ad libitum through one single hole self-feeder and a nipple waterer. The pigs were fed a pelleted diet in two phases −75 to 160 and 160 to 260 lb. BW. The composition of the basal diets is set forth in Table 5 for the grower pigs and Table 6 for the finisher pigs.

TABLE 5

Basal Diet Composition of Grower Pigs (As-fed Basis)[a]

| Ingredient, % | 0% MTO | .25% MTO | .50% MTO | 1.0% MTO |
|---|---|---|---|---|
| Corn | 68.76 | 68.76 | 68.76 | 68.76 |
| Soybean meal (46.5%) | 27.50 | 27.50 | 27.50 | 27.50 |
| Limestone | 1.05 | 1.05 | 1.05 | 1.05 |
| Cornstarch | 1.00 | .75 | .50 | 0.0 |
| Modified Tall Oil[b] | 0.0 | .25 | .50 | 1.0 |
| Monocalcium phosphate | .86 | .86 | .86 | .86 |
| Salt | .35 | .35 | .35 | .35 |
| Vitamin premix | .20 | .20 | .20 | .20 |
| Trace mineral premix | .15 | .15 | .15 | .15 |
| Antibiotic[c] | .13 | .13 | .13 | .13 |
| Total | 100.00 | 100.0 | 100.0 | 100.0 |

[a]Grower diets were fed from 75 to 160 lb BW and were formulated to contain 1.00% lysine, .65% Ca, and .55% total P.
[b]Pamolyn MTO, a by-product of kraft paper process
[c]Provided 100 g/ton tylosin

TABLE 6

Basal Diet Composition of Finisher Pigs (As-fed Basis)[a]

| Ingredient, % | 0% MTO | .25% MTO | .50% MTO | 1.00% MTO |
|---|---|---|---|---|
| Corn | 78.08 | 78.08 | 78.08 | 78.08 |
| Soybean meal (46.5% CP) | 18.43 | 18.43 | 18.43 | 18.43 |
| Limestone | .88 | .88 | .88 | .88 |
| Monocalcium phosphate | .78 | .78 | .78 | .78 |
| Cornstarch | 1.00 | .75 | .50 | 0.0 |
| Modified Tall Oil[b] | 0.0 | .25 | .50 | 1.00 |
| Salt | .35 | .35 | .35 | .35 |
| Vitamin premix | .20 | .20 | .20 | .20 |
| Trace mineral premix | .15 | .15 | .15 | .15 |
| Antibiotic[c] | .13 | .13 | .13 | .13 |
| Total | 100.0 | 100.0 | 100.0 | 100.0 |

[a]Finisher diets were fed from 160 to 230 lb BW and were formulated to contain 0.75% lysine, .55% Ca, and .50% total P.
[b]Pamolyn MTO, a by-product of kraft paper process
[c]Provided 100 g/ton tylosin The pigs were were weighed every 14 days in order to determine ADG, ADFI, and feed efficiency (F/G). After a three hour fast on the day before slaughter, plasma blood samples were collected from each pig for a triglyceride analysis. The triglyceride results were later combined for each pen for statistical analysis. When the average pen weight was 260 lb. BW, the pigs were slaughtered. At 24 hours post-mortem, standard carcass measurements, Minolta colorspectrometry (Hunter L*, a*, and b*) measurements, and visual analyses of the longissimus for coloring, marbling, and firmness were obtained. At 48 hours post-mortem, a drip loss analysis was conducted. During fabrication of the carcasses (at 24 hours post-mortem), the bellies from the right side of all carcasses were removed and used for firmness determinations using the barflop measurement procedure.

The data was analyzed as a randomized complete block. The experimental unit for all calculations was "pen." The IML procedure of SAS was used to generate the necessary orthogonal polynomial contrast coefficients needed for GLM procedures of SAS, by which all data was analyzed. Additionally, the weight and the length of the bellies were used as covariates for the analysis of belly firmness. The pigs fed the MTO supplemented diet had reduced first, last, and tenth rib, last lumbar, and average back fat depths as compared to control pigs. Furthermore, the MTO-fed pigs had larger longissimus muscle area resulting in higher lean percentages than in control pigs. The growth performance of the barrows is set forth in Table 7, and the carcass characteristics are set forth in Table 8.

TABLE 7

Growth Performance of Barrows Fed Increasing Levels of MTO[a]

| | MTO Mixture, % | | | | | Probability Values (P<) | |
|---|---|---|---|---|---|---|---|
| Item | 0 | .25 | .50 | 1.00 | CV | Linear | Quadratic |
| 75 to 160 lb BW: | | | | | | | |
| ADG, lb | 2.38 | 2.35 | 2.40 | 2.35 | 6.64 | .77 | .73 |
| ADFI, lb | 5.23 | 5.12 | 5.09 | 5.17 | 5.87 | .40 | .51 |
| F/G | 2.20 | 2.19 | 2.12 | 2.20 | 4.81 | .57 | .21 |
| 160 to 260 lb BW: | | | | | | | |
| ADG, lb | 2.17 | 2.15 | 2.18 | 2.14 | 7.82 | .85 | .89 |
| ADFI, lb | 6.59 | 6.52 | 6.53 | 6.31 | 6.51 | .93 | .43 |
| F/G | 3.04 | 3.05 | 2.99 | 2.96 | 6.02 | .70 | .29 |
| 75 to 260 lb BW: | | | | | | | |
| ADG, lb | 2.27 | 2.23 | 2.28 | 2.23 | 5.74 | .71 | .79 |
| ADFI, lb | 5.98 | 5.89 | 5.89 | 5.80 | 5.67 | .79 | .44 |
| F/G | 2.64 | 2.64 | 2.58 | 2.60 | 4.54 | .88 | .19 |

[a]Values are means for two pigs/pen and 10 replicate pens/treatment.

TABLE 8

Carcass Characteristics of Barrows Fed Increasing Levels of MTO[a,b]

| | MTO Mixture, % | | | | | Probability Values (P<) | |
|---|---|---|---|---|---|---|---|
| Item | 0 | .25 | .50 | 1.00 | CV | Linear | Quadratic |
| Shrink loss, % | 1.99 | 2.03 | 2.03 | 2.09 | 5.12 | .71 | .20 |
| Backfat: | | | | | | | |
| First rib, in | 1.51 | 1.52 | 1.44 | 1.47 | 8.61 | .74 | .13 |
| Tenth rib, in | .88 | .83 | .76 | .77 | 17.17 | .82 | .04 |
| Last rib, in | .96 | .99 | .91 | .91 | 9.50 | .19 | .04 |
| Last lumbar, in | .85 | .80 | .76 | .74 | 12.34 | .75 | .02 |
| Average, in[c] | 1.10 | 1.10 | 1.04 | 1.04 | 7.73 | .60 | .02 |
| LMA, in$^2$ | 6.39 | 6.51 | 6.73 | 6.74 | 7.45 | .80 | .07 |
| Lean %[d] | 51.79 | 52.52 | 53.59 | 53.69 | 3.69 | .83 | .03 |
| Dressing % | 74.29 | 73.63 | 73.69 | 73.31 | 1.09 | .27 | .11 |
| Visual color[e] | 2.35 | 2.53 | 2.35 | 2.39 | 11.38 | .19 | .49 |
| Firmness[e] | 2.40 | 2.65 | 2.63 | 2.64 | 12.73 | .21 | .27 |
| Marbling[e] | 2.18 | 2.38 | 2.30 | 2.39 | 13.34 | .30 | .41 |
| Hunter L*[f] | 55.08 | 53.78 | 53.49 | 55.03 | 4.80 | .22 | .52 |
| Hunter a*[f] | 13.95 | 12.25 | 11.92 | 13.27 | 13.67 | .04 | .12 |
| Hunter b*[f] | 12.13 | 8.47 | 8.27 | 9.50 | 39.65 | .07 | .14 |
| Hue angle[f] | 48.05 | 48.37 | 48.11 | 50.41 | 12.76 | .87 | .75 |
| Saturation index[g] | 19.21 | 14.91 | 14.53 | 16.34 | 24.37 | .04 | .09 |
| A:B ratio[f] | 1.39 | 1.46 | 1.47 | 1.41 | 7.07 | .16 | .40 |
| Drip loss, % | 5.17 | 4.99 | 3.60 | 4.95 | 32.63 | .64 | .04 |
| Carcass length, in | 33.35 | 32.70 | 32.86 | 33.02 | 1.80 | .03 | .42 |
| Muscling | 2.55 | 2.45 | 2.50 | 2.50 | 4.05 | .05 | .73 |
| Belly Firmness, initial[g] | 9.24 | 11.05 | 10.88 | 11.92 | 27.16 | .39 | .23 |
| Belly Firmness, 1 min[g] | 8.60 | 10.30 | 10.12 | 11.16 | 27.29 | .39 | .22 |
| Belly Firmness, 5 min[g] | 8.05 | 9.70 | 9.01 | 10.09 | 29.98 | .36 | .53 |
| Triglycerides[b] | 29.50 | 28.12 | 31.36 | 30.42 | 24.88 | .64 | .39 |

[a]Values are means for two pigs/pen and six replicate pens/treatment.
[b]Hot carcass weight was used as a covariate in the statistical analysis.
[c]Average backfat is the average of the first and last rib and last lumbar fat depths.
[d]Lean percentage was derived from NPPC equations.
[e]Scoring system of 1 to 5:2 = grayish pink, traces to slight, or soft and watery; 3 = reddish pink, small to modest, or slightly firm and moist; and 4 purplish red, moderate to slightly abundant, or firm and moderately dry for color, firmness, and marbling, respectively.
[f]Means were derived from three sample readings per loin. Measures of dark to light (Hunter L*), redness (Hunter a*), yellowness (Hunter b*), red to orange (hue angle), or vividness or intensity (saturation index).

TABLE 8-continued

Carcass Characteristics of Barrows Fed Increasing Levels of MTO[a,b]

| Item | MTO Mixture, % | | | | CV | Probability Values (P<) | |
|---|---|---|---|---|---|---|---|
|  | 0 | .25 | .50 | 1.00 | CV | Linear | Quadratic |

[g]Belly firmness scores refer to the degree of droop (inches) when the bellies were centrally suspended by a bar. Thus, larger values indicate firmer bellies. Belly length and weight were used as covariates for this portion of the statistical analysis.
[h]Values represent the pooled results of both pigs/pen bled the day before slaughter. Triglyceride levels are expressed as mg/dL.

The diet and method of the present invention increases the ADG of the pigs and thus decreases the time to market when compared to control diets and diets supplemented with Tonalin™ CLA 60. In growing a pig from 80 lb. to 230 lb., the pigs fed MTO supplemented diets had an ADG of 2.36 lb. (See Table 3). The pigs fed Tonalin™ CLA 60 supplemented diets had an ADG of 2.14 lb. while the control pigs had an ADG of 2.28 lb. Tables 9 and 10 illustrate the number of days necessary to achieve a market weight of 230 lb. as well as the number of days saved by supplementing the pigs diets with MTO as opposed to Tonalin™ CLA 60 and the control diet. As will be appreciated, the diet of this invention results in a substantial cumulative savings for the producer over non-supplemented diets and Tonalin™ CLA 60 supplemented diets.

TABLE 9

Days to Achieve Market Weight - MTO vs. CLA[a]

| Supplement[b] | Days to 230 lbs. | Days Saved vs. CLA[a] | Savings per Pig[c] |
|---|---|---|---|
| MTO | 97.5 | 10 | $1.00 |
| CLA[a] | 107.5 | — | — |

[a]Tonalin ™ CLA 60
[b]Diets fed as described in Example 1.
[c]At an average yardage cost of ten cents per day.

TABLE 10

Days to Achieve Market Weight - MTO vs. Control

| Supplement[a] | Days to 230 lbs. | Days Saved vs. Control | Savings per Pig |
|---|---|---|---|
| MTO | 97.5 | 3.4 | $0.34 |
| Control | 100.9 | — | — |

[a]Diets fed as described in Example 1.
[b]At an average yardage cost of ten cents per day.

We claim:

1. A method of feeding a pig comprising feeding to the pig a solid pig feed along with modified tall oil.

2. The method of claim 1, including the step of feeding at least about 0.25% by weight of modified tall oil, based upon the weight of said solid pig feed consumed by the pig.

3. The method of claim 2, including the step of feeding from about 0.25 to about 1.0% by weight of modified tall oil.

4. The method of claim 1, including the step of mixing said modified tall oil with said solid pig feed.

5. The method of claim 1, including the step of feeding said modified tall oil as a liquid separate from said solid pig feed.

6. The method of claim 1, including the step of feeding sufficient modified tall oil to achieve a feed efficiency which is at least about 0.75% greater than an otherwise identical feeding method free of modified tall oil.

7. The method of claim 1, said modified tall oil having a fatty acid profile such that at least about 60% by weight of the modified tall oil is made up of a mixture of Conjugate 1, Conjugate 2, Conjugate 3, Conjugate 4, and Conjugate 5.

8. The method of claim 1, said modified tall oil having a fatty acid profile such that at least about 27% by weight of the modified tall oil is made up of a mixture of Conjugate 1 and Conjugate 2.

9. A method of feeding a pig comprising feeding to the pig a solid pig feed along with at least about 0.25% by weight of a mixture of conjugated linoleic acids, said mixture including from about 5–20% by weight of Conjugate 2.

10. The method of claim 9, said mixture having from about 10–17% by weight of Conjugate 2.

11. The method of claim 9, wherein said mixture is mixed with said solid pig feed.

12. The method of claim 9, wherein said mixture is a liquid which is fed separate from said solid pig feed.

13. The method of claim 9, including the step of feeding sufficient mixture to achieve a feed efficiency which is at least about 0.75% greater than an otherwise identical feeding method free of said mixture.

14. A method of feeding a pig comprising feeding to the pig a solid pig feed along with at least about 0.25% by weight of a mixture of conjugated linoleic acids, based upon the weight of solid pig feed consumed by the pig, said mixture having a fatty acid profile such that at least about 60% by weight of the mixture is made up of a mixture of Conjugate 1, Conjugate 2, Conjugate 3, Conjugate 4, and Conjugate 5.

15. The method of claim 14, including the step of mixing said mixture with said solid pig feed.

16. The method of claim 14, including the step of feeding said mixture as a liquid separate from said solid pig feed.

17. The method of claim 14, including the step of feeding sufficient mixture to achieve a feed efficiency which is at least about 0.75% greater than an otherwise identical feeding method free of said mixture.

18. The method of claim 14, said mixture also having a fatty acid profile such that at least about 27% by weight of the mixture is made up of a mixture of Conjugate 1 and Conjugate 2.

19. A solid animal feed comprising from about 12% to about 50% by weight protein and at least about 0.25% by weight of modified tall oil.

20. The feed of claim 19, said modified tall oil being present at a level of from about 0.25–1.0% by weight.

21. The feed of claim 19, said modified tall oil having a fatty acid profile such that at least about 60% by weight of the modified tall oil is made up of a mixture of Conjugate 1, Conjugate 2, Conjugate 3, Conjugate 4, and Conjugate 5.

22. The feed of claim 19, said modified tall oil having a fatty acid profile such that at least about 27% by weight of the modified tall oil is made up of a mixture of Conjugate 1 and Conjugate 2.

23. A solid animal feed comprising at least about 0.25% by weight of a mixture of conjugated linoleic acids, said mixture including from about 5–20% by weight of Conjugate 2.

24. The feed of claim 23, said mixture having from about 10–17% by weight of Conjugate 2.

25. A solid animal feed comprising at least about 0.25% by weight of a mixture of conjugated linoleic acids said mixture having a fatty acid profile such that at least about 60% by weight of the mixture is made up of a mixture of Conjugate 1, Conjugate 2, Conjugate 3, Conjugate 4, and Conjugate 5.

26. The feed of claim 25, said mixture also having a fatty acid profile such that at least about 27% by weight of the mixture is made up of a mixture of Conjugate 1 and Conjugate 2.

* * * * *